United States Patent
Liu et al.

(10) Patent No.: US 8,674,284 B2
(45) Date of Patent: Mar. 18, 2014

(54) SENSING DEVICE HAVING PHOTO SENSING ELEMENT ALTERNATELY OPERATED IN DIFFERENT BIASED STATES AND RELATED TOUCH-CONTROLLED DISPLAY DEVICE

(75) Inventors: Tzu-Wei Liu, Hsin-Chu (TW); Hsueh-Ying Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 297 days.

(21) Appl. No.: 13/103,999

(22) Filed: May 9, 2011

(65) Prior Publication Data

US 2012/0113055 A1 May 10, 2012

(30) Foreign Application Priority Data

Nov. 5, 2010 (TW) .............................. 99138039 A

(51) Int. Cl.
*H01J 40/14* (2006.01)

(52) U.S. Cl.
USPC ...................................... 250/214 R; 345/175

(58) Field of Classification Search
USPC ............ 250/208.1, 221, 214 R; 345/175, 207
See application file for complete search history.

(56) References Cited

U.S. PATENT DOCUMENTS

| 7,009,663 B2 | 3/2006 | Abileah |
| 2007/0145239 A1* | 6/2007 | Mheen et al. ............... 250/208.1 |
| 2010/0090996 A1* | 4/2010 | Chou et al. ..................... 345/207 |

* cited by examiner

*Primary Examiner* — Thanh Luu
(74) *Attorney, Agent, or Firm* — Winston Hsu; Scott Margo

(57) ABSTRACT

The present invention provides a sensing device and a display device utilizing the sensing device. A photo sensing element of the sensing device is alternatively operated in a biased state and a reverse-biased state to prevent the stress issue. Furthermore, the sensing device improves the S/N ratio by generating an output signal through an active component. The display device including the sensing device prevents the stress issue and improves the S/N ratio by using specific driving signals.

15 Claims, 14 Drawing Sheets

US 8,674,284 B2

SENSING DEVICE HAVING PHOTO SENSING ELEMENT ALTERNATELY OPERATED IN DIFFERENT BIASED STATES AND RELATED TOUCH-CONTROLLED DISPLAY DEVICE

BACKGROUND OF THE INVENTION

1. Field of the Invention

The present invention relates to a sensing device, and more particularly, to a sensing device employed in a touch-controlled display device.

2. Description of the Prior Art

Touch-controlled display devices are widely used in various electronic products in the market. When the touch source touches the figures or objects on the touch screen, a sensing device of the touch-controlled display device judges an occurrence of a touch event, and then an internal processing system operates according to a program compiled in advance. Traditionally, sensing devices employed in touch-controlled display devices may be categorized into two different types as shown in FIG. 1 and FIG. 2.

Please refer to FIG. 1 first. The sensing device shown in the figure turns on the transistor $M_2$ mainly by the signal $S_1$ to charge the capacitor C. Then, a photo diode PD generates a leakage current having different intensity in response to different magnitude of the ambient light source, where the ambient light source has an instant magnitude change when there is a touch source approaching, and the leakage current would discharge the capacitor C to change a terminal voltage of the capacitor C. When the signal $S_2$ is raised to a high logic level, the terminal voltage of the capacitor C is raised, and the output voltage $V_{out}$ is changed correspondingly. Therefore, checking the voltage level of the output voltage $V_{out}$ can judge whether a touch event occurs. However, regarding this type of sensing device, since the photo diode PD stays in a biased state for a long period of time, the electric charges are accumulated in a PN junction of the photo diode PD or the occurrence probability of defect states is increased, leading to a shifted I-V curve of the photo diode PD. Consequently, it is hard to control the relationship between the discharging extent of the capacitor C and the magnitude of the ambient light source, which affects the accuracy of the touch event judgment.

Moreover, the sensing device shown in FIG. 2 also judges whether a touch event occurs by charging the capacitor C and then discharging the capacitor C. However, this type of sensing device discharges the capacitor C by a photo-transistor $M_2$, and the discharging extent is also affected by the magnitude of the ambient light source. The photo-transistor $M_2$ is biased mainly by fixed voltages $V_{B1}$ and $V_{B2}$, and thus continuously operates in the biased state. Besides, the output voltage $V_{out}$ is generated directly according to the terminal voltage of the capacitor C through the transistor $M_1$, and then the touch event is judged according to the output voltage $V_{out}$. Regarding this type of sensing device, the photo-transistor $M_2$ also stays in the biased state for a long period of time. Therefore, the electric charges are accumulated in a junction of the photo-transistor $M_2$ or the occurrence probability of defect states is increased, leading to a shifted I-V curve of the photo-transistor $M_2$. Consequently, it is hard to control the relationship between the discharging extent of the capacitor C and the magnitude of the ambient light source, which affects the accuracy of the touch event judgment. Moreover, the output signal $V_{out}$ is generated directly according to the terminal voltage of the capacitor C. In the generating process of the output signal $V_{out}$, the terminal voltage of the capacitor C may have a slight variation because of the continuous generation of the leakage current. This also affects the accuracy of the touch event judgment. It can be readily known from the two examples mentioned above that the conventional design still has room for improvement.

SUMMARY OF THE INVENTION

In view of above, the present invention provides an innovative sensing device that may avoid the disadvantage of the conventional sensing device design. The characteristic of the present invention is that by a proper design of a biased signal which changes the biased state of the photo sensing element, alternately, the electric charges accumulated in the photo sensing element are released to thereby prevent the stress issue and accordingly solve the shifted I-V curve issue. Moreover, the present invention generates output signals by active components to thereby increase the overall signal-to-noise (S/N) ratio, and properly uses the control signal of the display device disposed in the sensing device as a biased signal to thereby save the cost of implementing an additional control circuit and improve the aperture ratio.

Since the photo sensing element may be an element having a two-terminal structure (e.g., a diode) or an element having a three-terminal structure (e.g. a transistor), different embodiments of the present invention therefore provide driving control signals of different timings to change the biased states of the photo sensing element that has a two-terminal structure or three-terminal structure, in order to solve the issue encountered by the conventional sensing device design.

One exemplary embodiment of the present invention provides a sensing device. The sensing device includes a photo sensing element having a first terminal and a control terminal. The control terminal of the photo sensing element is utilized for receiving a first signal, and the first terminal of the photo sensing element is utilized for receiving a second signal. The first signal and the second signal are both driving signals each supporting two logic levels, a high logic level corresponding to the voltage value of the first signal is higher than a high logic level corresponding to the voltage value of the second signal, and a low logic level corresponding to the voltage value of the first signal is not higher than a low logic level corresponding to the voltage value of the second signal.

According to the sensing device mentioned above, the present invention provides a touch-controlled display device. The touch-controlled display device includes a plurality of aforementioned sensing devices arranged in a matrix. The touch-controlled display device includes: a plurality of scan lines for receiving scan line driving signals; a plurality of date lines; and a plurality of pixel elements that are arranged in a matrix, wherein the first signal is a scan line driving signal.

Besides, another exemplary embodiment of the present invention provides a sensing device. The sensing device includes a photo sensing element having a first terminal and a control terminal. The control terminal of the photo sensing element is utilized for receiving a first signal, and the first terminal is electrically connected to a second signal. The first signal and the second signal are both driving signals each supporting two logic levels, and the logic level of the first signal is not synchronized with the logic level of the second signal.

According to the sensing device mentioned above, the present invention provides a touch-controlled display device. The touch-controlled display device includes a plurality of aforementioned sensing devices arranged in a matrix. The touch-controlled display device includes: a plurality of scan lines for respectively receiving a plurality of scan line driving signals; a plurality of date lines; and a plurality of pixel elements that are arranged in a matrix, wherein the first signal is one of the scan line driving signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
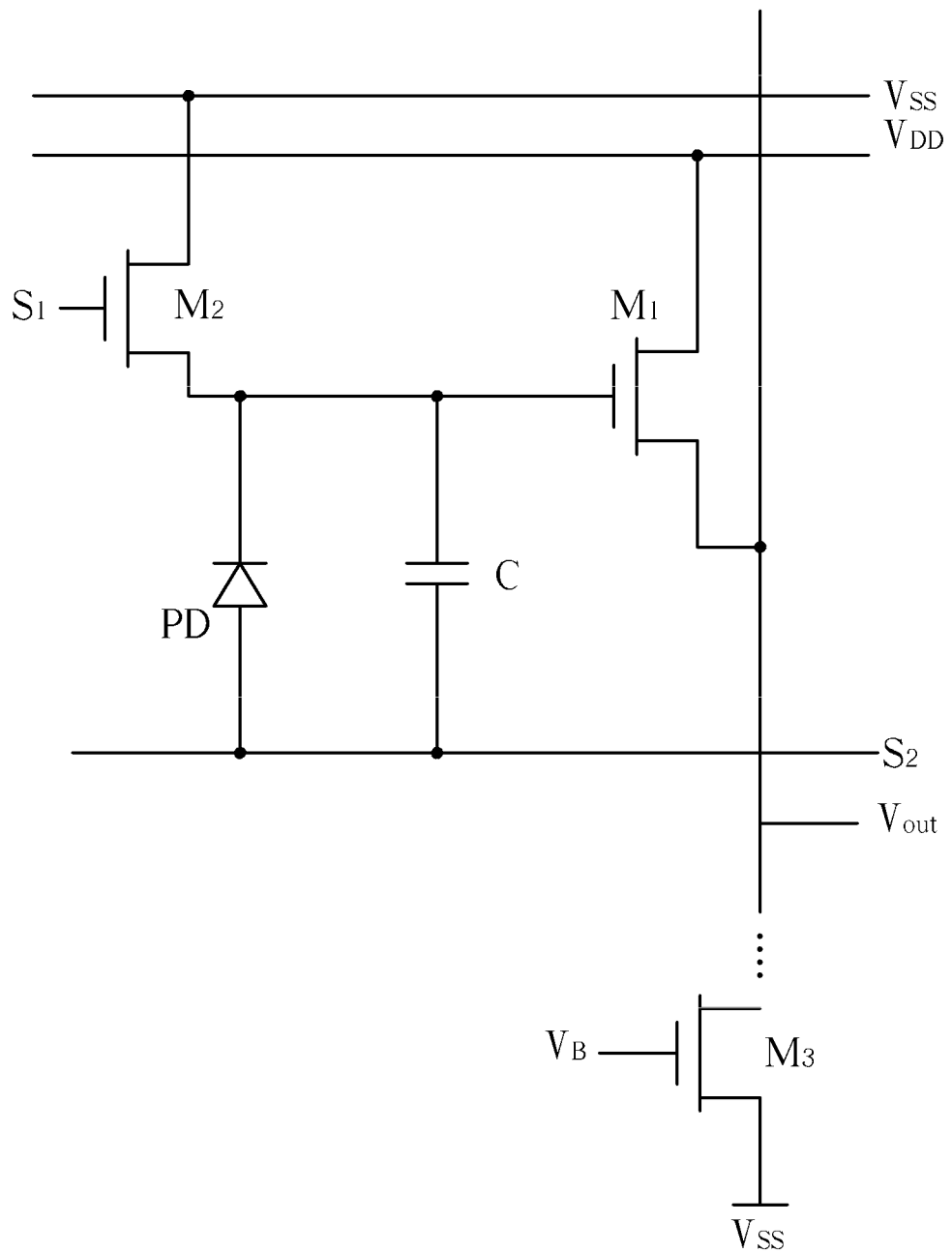
FIG. 1 is a circuit diagram of a conventional sensing device.
Figure 2:
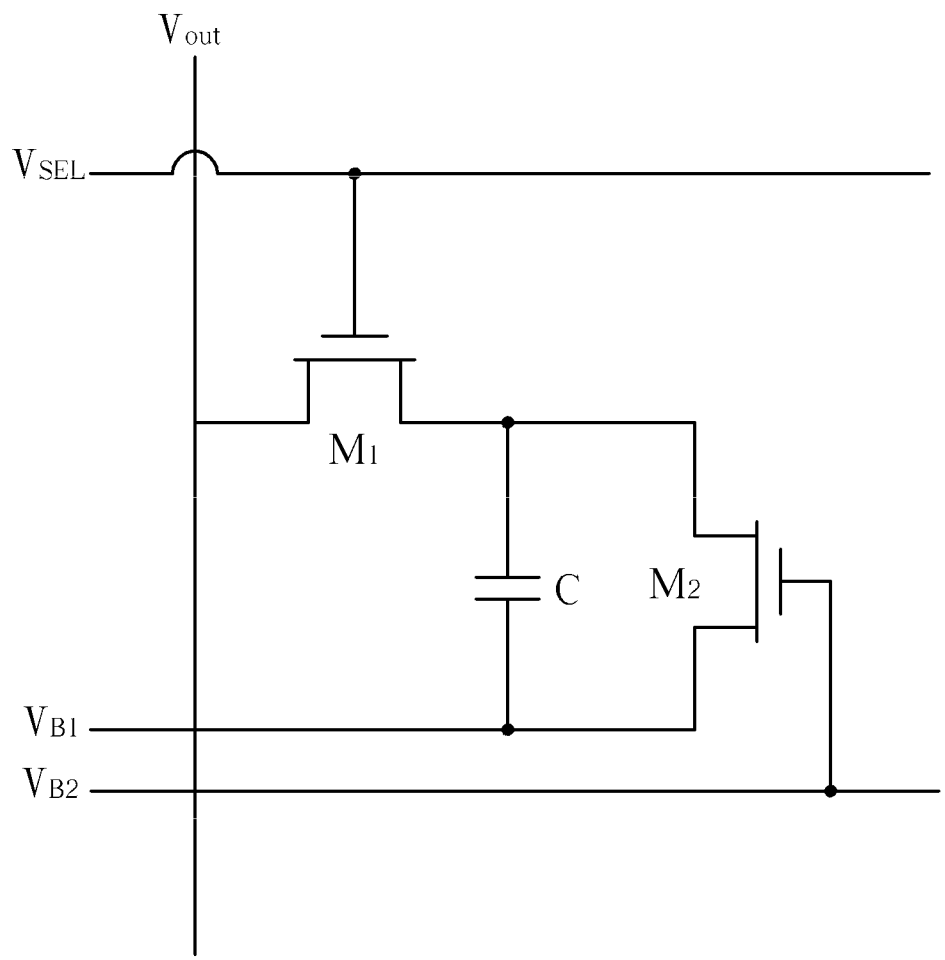
FIG. 2 is a circuit diagram of another conventional sensing device.

The concept of the present invention is illustrated with reference to different exemplary embodiments and relevant figures. Elements or devices with the same reference numeral in different figures have similar operation principles and technical effects. Thus, repeated description is omitted below for brevity. Moreover, different technical features mentioned in different exemplary embodiments are not limited to the exemplary embodiments only. In fact, in a reasonable scope of the present invention, one of the exemplary embodiments may be properly modified to have specific technical features of other exemplary embodiments.

Figure 3:
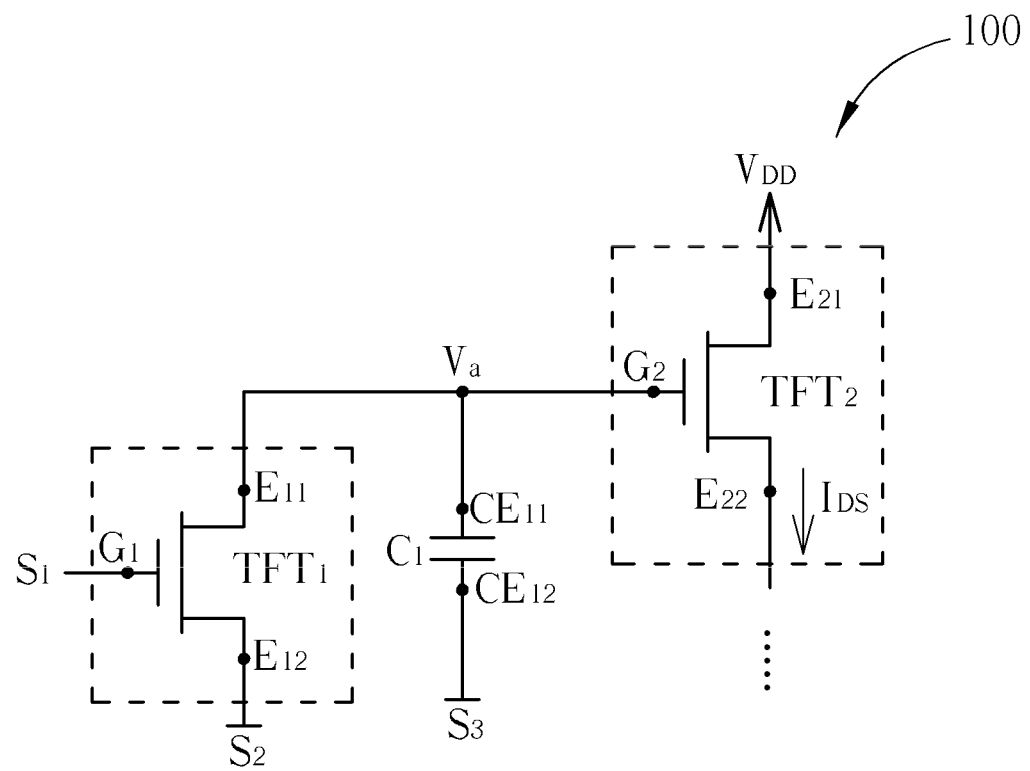
FIG. 3 is a diagram illustrating a circuit structure of a first exemplary embodiment of a sensing device according to the present invention and transition timing of control signals of the sensing device.
Figure 3:
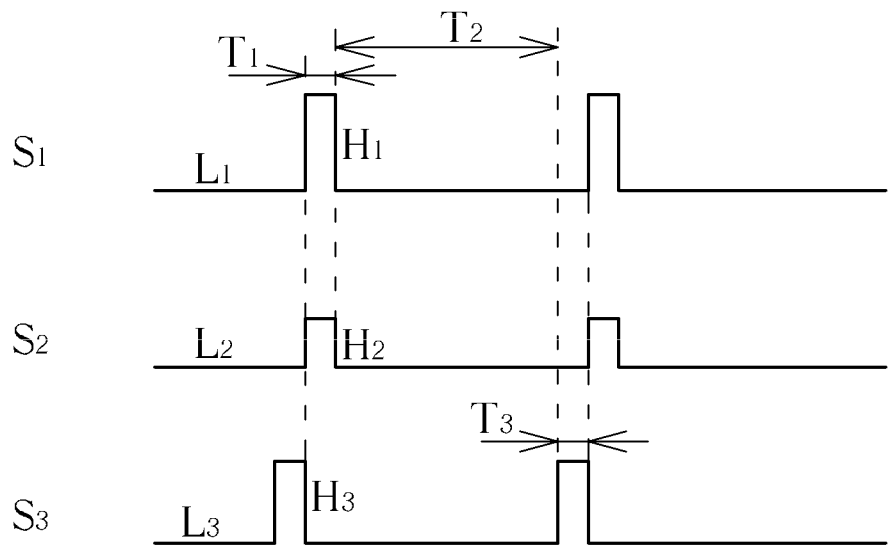

FIG. 3 shows the first exemplary embodiment of the sensing device according to the present invention. The sensing device includes a photo sensing element that has a three-terminal structure. The photo sensing element may be a photo-transistor; therefore, in the illustration below, the transistor $TFT_1$ is used to represent the photo sensing element that has a three-terminal structure. However, it is not the only limitation to the photo sensing element that has a three-terminal structure of the present invention. In other exemplary embodiments of the present invention, the photo sensing element may be realized by any three-terminal photo sensing element except for the transistor. The sensing device 100 includes a first transistor $TFT_1$, a second transistor $TFT_2$ and a first capacitor $C_1$. The first transistor $TFT_1$ has a first terminal $E_{11}$, a control terminal $G_1$ and a second terminal $E_{12}$. The second transistor $TFT_2$ has a first terminal $E_{21}$, a control terminal $G_2$ and a second terminal $E_{22}$. The first capacitor $C_1$ has a first electrode $CE_{11}$ and a second electrode $CE_{12}$. The control terminal $G_1$ of the first transistor $TFT_1$ is utilized for receiving a first signal $S_1$, and the second terminal $E_{12}$ of the first transistor $TFT_1$ is utilized for receiving a second signal $S_2$. The control terminal $G_2$ of the second transistor $TFT_2$ is electrically connected to the first terminal $E_{11}$ of the first transistor $TFT_1$. The second transistor $TFT_2$ is electrically connected to read circuit (not shown in the figure), and the read circuit judges whether a touch event happens on the sensing device 100 according to the output current $I_{DS}$ that is generated when the second transistor $TFT_2$ is conductive. The first electrode $CE_{11}$ of the first capacitor $C_1$ is electrically connected to the first terminal $E_{11}$ of the first transistor $TFT_1$ and the control terminal $G_2$ of the second transistor $TFT_2$. Besides, the second electrode $CE_{12}$ of the first capacitor $C_1$ is electrically connected to a third signal $S_3$. The first signal $S_1$ and the second signal $S_2$ are driving signals each supporting two logic levels, and the first signal $S_1$ and the second signal $S_2$ are signals that have different voltage values, and may change the biased state of the first transistor $TFT_1$ (i.e., the photo sensing element), alternately. Besides, the logic level transition timing of the third signal $S_3$ is different from the logic level transition timing of each of the first signal $S_1$ and the second signal $S_2$.

Please refer to the lower part of FIG. 3 for exemplary illustration of the logic level transition timing of signals $S_1$-$S_3$. As can be known from the figure, when the sensing device 100 is operated at the resetting phase ($T_1$), the first signal $S_1$ is raised to a high logic level $H_1$, and the second signal $S_2$ is also raised to a high logic level $H_2$, which makes the first transistor $TFT_1$ stay in a forward-biased state. Meanwhile, the first capacitor $C_1$ is charged through the first transistor $TFT_1$, thereby raising the terminal voltage $V_a$. When charging of the capacitor $C_1$ is finished, the sensing device 100 is operated at the sensing phase ($T_2$); meanwhile, the first signal $S_1$ is lowered to a low logic level $L_1$, and the second signal $S_2$ is also lowered to a low logic level $L_2$, which makes the first transistor $TFT_1$ stay in a reverse-biased state. Meanwhile, the voltage value corresponding to the low logic level $L_1$ is not higher than the voltage value corresponding to the low logic level $L_2$. Thus, the first transistor $TFT_1$ generates a leakage current to discharge the first capacitor $C_1$, and the terminal voltage $V_a$ is reduced accordingly. Since the first transistor $TFT_1$ is a photo sensing element, the intensity of the leakage current changes with the ambient light source. When a touch event happens on the sensing device 100, the ambient light source is shaded, and the leakage current of the first transistor $TFT_1$ is decreased accordingly; otherwise, the leakage current of the first transistor $TFT_1$ is comparatively large. After a period of time, the sensing device 100 enters a read phase ($T_3$). In this operational phase, the first signal $S_1$ and the second signal $S_2$ still maintain at the low logic levels $L_1$ and $L_2$, respectively, and the third signal $S_3$ is raised to a high logic level $H_3$. This voltage is coupled to the first capacitor $C_1$, and therefore raises the terminal voltage $V_a$ to make the second transistor $TFT_2$ conductive. An output current $I_{DS}$ is generated accordingly. The intensity of the output current $I_{DS}$ is relevant to the terminal voltage $V_a$, it is charged to the highest level at the resetting phase and then reduced due to discharging at the following sensing phase and read phase, and a voltage level corresponding to the high logic level $H_3$ of the third signal $S_3$. Finally, the read circuit judges whether a touch event happens on the sensing device 100 according to the intensity of the output current $I_{DS}$.

Figure 10:
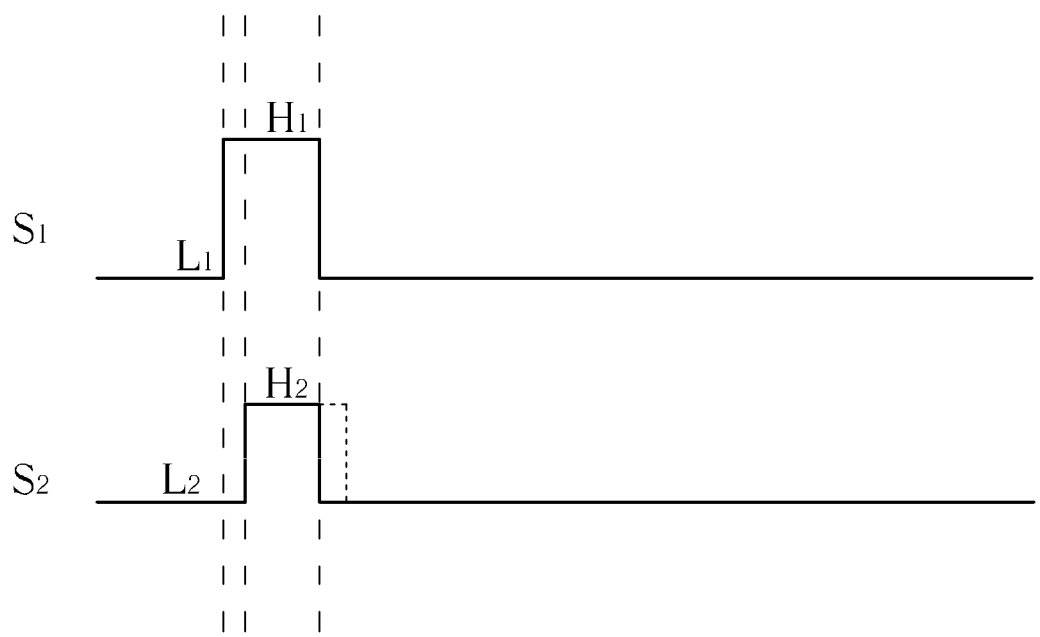
FIG. 10 is a waveform diagram of control signals according to another exemplary embodiment of the present invention.

The first signal $S_1$ is synchronized with the second signal $S_2$ in this exemplary embodiment; however, in other exemplary embodiments of the present invention, the first signal $S_1$ may not be synchronized with the second signal $S_2$. When the first signal $S_1$ is not synchronized with the second signal $S_2$, the pulse falling edge timing corresponding to the second signal $S_2$ may be equal to the pulse falling edge timing corresponding to the first signal $S_1$. One of the possible relations is shown in FIG. 10, wherein the timing at which the second signal $S_2$ has a transition from the low logic level $L_2$ to the high logic level $H_1$ lags behind the timing at which the first signal $S_1$ has a transition from the low logic level $L_1$ to the high logic level $H_1$; moreover, the timing at which the second signal $S_2$ has a transition from the high logic level $H_2$ to the low logic level $L_2$ may be equal to or lag behind the timing at which the first signal $S_1$ has a transition from the high logic level $H_1$ to the low logic level $L_1$. In the exemplary embodiment shown in FIG. 10, the third signal S3 is the one shown in FIG. 3, and is raised to a high logic level $H_3$ when the sensing device 100 enters the read phase ($T_3$). Further description is omitted here for brevity.

Figure 11:
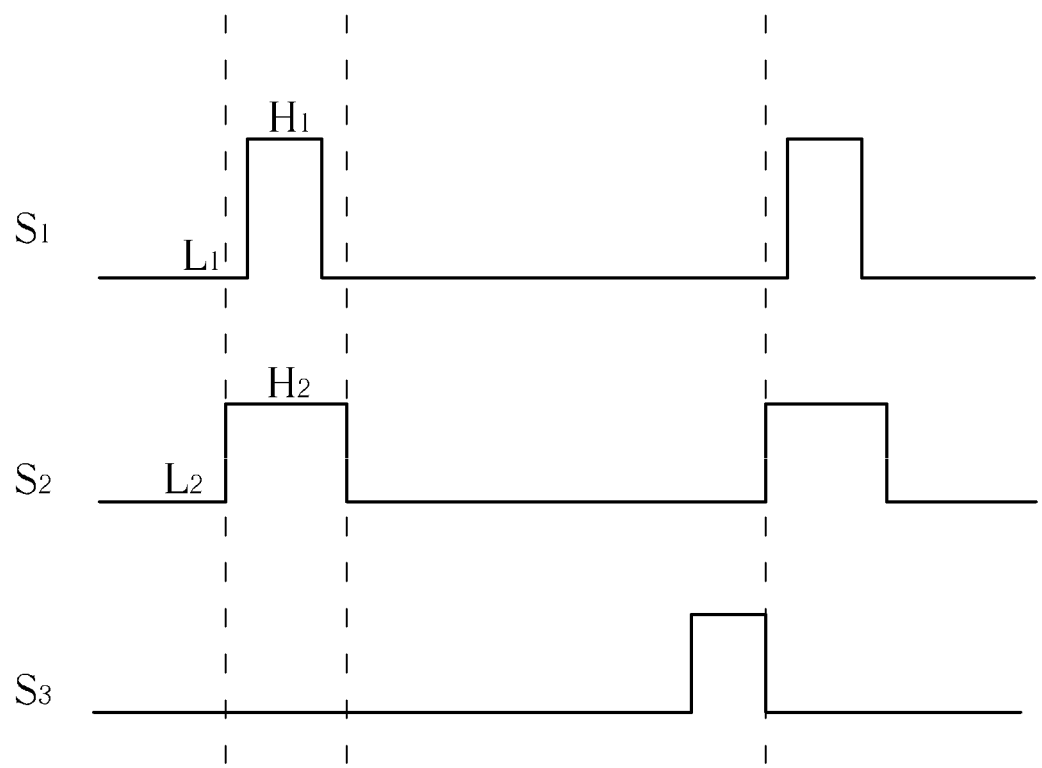
FIG. 11 is a waveform diagram of control signals according to yet another exemplary embodiment of the present invention.

Moreover, the pulse falling edge timing corresponding to the second signal $S_2$ may also lag behind the pulse falling edge timing corresponding to the first signal $S_1$, and one of the possible relations is shown in FIG. 11. In this exemplary embodiment, the pulse falling edge timing corresponding to the second signal $S_2$ lags behind the pulse falling edge timing corresponding to the first signal $S_1$. Please note that the timing at which the second signal $S_2$ has a transition from the low logic level $L_2$ to the high logic level $H_2$ is not within the time period during which the third signal $S_3$ has the high logic level $H_3$. However, it is only one possible embodiment of the present invention, and is not meant to be the only variation of the present invention.

The relationship of voltage values corresponding to logic levels of the signals $S_1$-$S_3$ is detailed as follows. In order to alternately change the biased state of the first transistor $TFT_1$, i.e., to make the first transistor $TFT_1$ alternately operated at the forward-biased state and the reverse-biased state, the voltage value corresponding to the high logic level $H_1$ of the first signal $S_1$ must be higher than the voltage value corresponding to the high logic level $H_2$ of the second signal $S_2$, which is for making the first transistor $TFT_1$ operated at the forward-biased state. The voltage value corresponding to the low logic level $L_1$ of the first signal $S_1$ must not be higher than the voltage value corresponding to the low logic level $L_2$ of the first signal $S_2$, which is for making the first transistor $TFT_1$ operated at the reverse-biased state. Besides, as the sensing device 100 is still operated at the resetting phase when the second signal $S_2$ has the high logic level $H_2$, the second transistor $TFT_2$ is not allowed to be conductive at this moment, in order to prevent a false judgment of the touch event. However, when the second signal $S_2$ has the high logic level $H_2$, the terminal voltage $V_a$ is inevitably raised. Hence, the selection of the voltage value corresponding to the high logic level $H_2$ of the second signal $S_2$ must ensure that the second transistor $TFT_2$ would not be conductive.

Besides, the sensing device of the present exemplary embodiment is disposed in a touch-controlled display device to act as a necessary touch sensing means in practice. Please refer to FIG. 8. The touch-controlled display device 800 includes a plurality of pixel elements 815 arranged in a matrix, a read circuit 830 and a plurality of sensing devices 100 arranged in a matrix. Besides, the touch-controlled display device 800 further includes a plurality of scan lines $GL_1$-$GL_N$, a plurality of data lines $DL_1$-$DL_N$, and a plurality of read lines $RL_1$-$RL_N$ electrically connected to the read circuit 830. The pixel elements 815 are mainly utilized for displaying images to be displayed. The scan lines $GL_1$-$GL_N$ and the data lines $DL_1$-$DL_N$ are utilized for receiving scan line driving signals generated from gate drivers and data line signals generated from source drivers, respectively, and are utilized for controlling the pixel elements 815 to perform the image display operation. Since those skilled in the art should readily understand operations and principles of these circuit elements, further description is omitted here for brevity.

Figure 8:
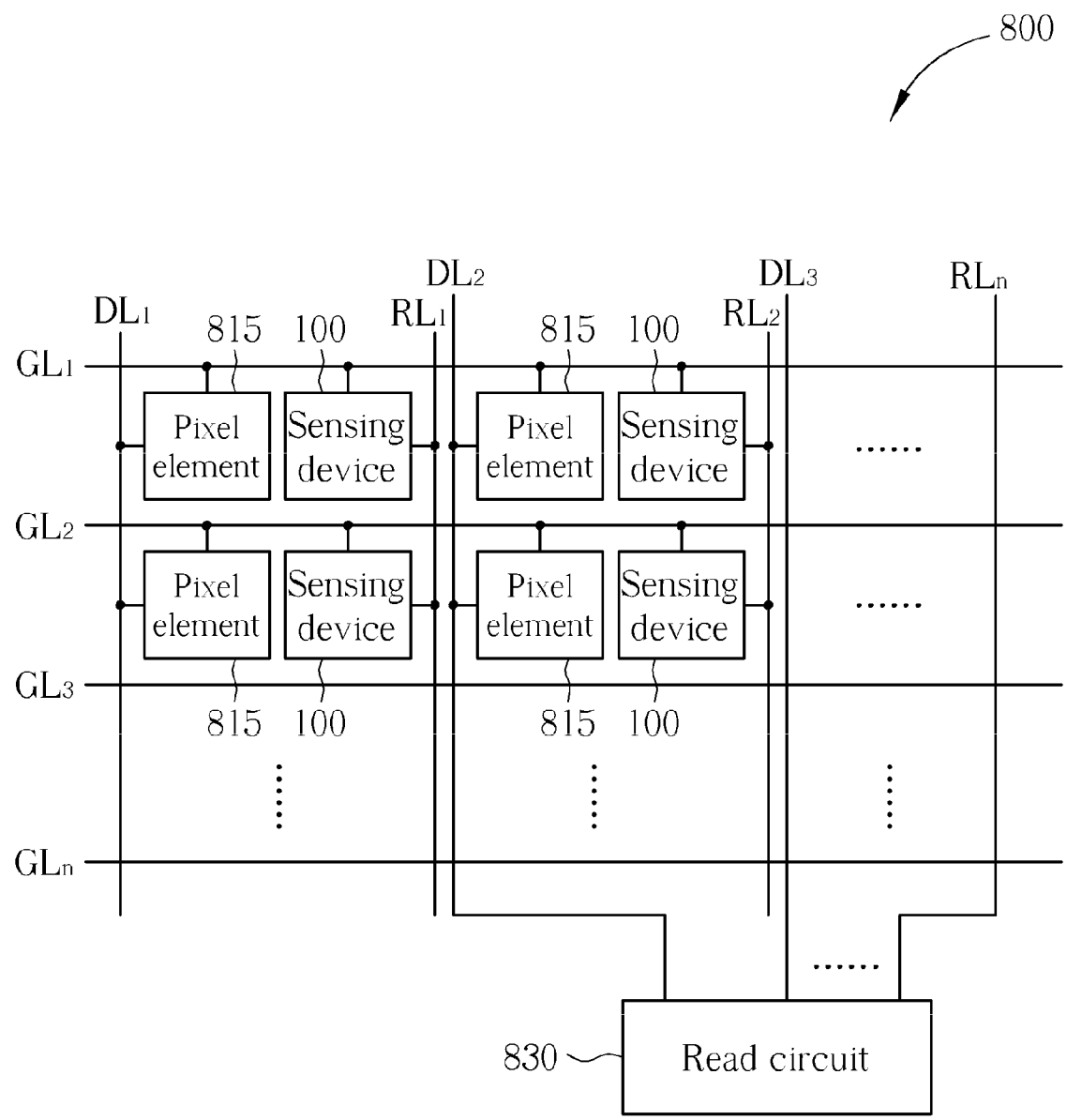
FIG. 8 is a diagram illustrating one exemplary embodiment of a display device according to the present invention.

The arrangement of sensing devices 100 is similar to that of pixel elements 815. In the present invention, driving signals on the scan lines $GL_1$-$GL_N$ are utilized for acting as the first signal $S_1$ to bias the sensing devices 100. Thus, sensing devices 100 are respectively connected to the scan lines $GL_1$-$GL_N$, as shown in FIG. 8. The control terminals $G_1$ of the first transistors $TFT_1$ in the sensing devices 100 receive driving signals on scan lines $GL_1$-$GL_N$. Moreover, the first transistor $TFT_1$ in each of the sensing devices 100 is forward-biased and reverse-biased alternately according to one of the driving signals on the scan lines $GL_1$-$GL_N$, while the read circuit 830 reads sensing results (e.g., the output current $I_{DS}$) generated by the sensing devices 100 through the read lines $RL_1$-$RL_N$. Therefore, in this exemplary embodiment, the signal generating circuit or driving circuit required for generating the first signals $S_1$ may be omitted. In this exemplary embodiment, the third signal $S_3$ is preferably independent of driving signals on the scan lines $GL_1$-$GL_N$. More specifically, in a case where the voltage value corresponding to the high logic level $H_3$ of the third signal $S_3$ is too high, once it is coupled to the first capacitor $C_1$, the terminal voltage $V_a$ generated at the sensing phase is raised excessively, which makes the second transistor $TFT_2$ fail to generate the output current $I_{DS}$ with proper intensity corresponding to the present ambient light source at the read phase.

It should be noted that in the first exemplary embodiment of the present invention, the terminal voltage $V_a$ is electrically connected to the control terminal of the second transistor $TFT_2$; however, this is not meant to be a limitation of the present invention. In other exemplary embodiments, the terminal voltage $V_a$ may be electrically connected to the first terminal $E_{21}$ or the second terminal $E_{22}$ of the second transistor $TFT_2$. Both alternative designs fall into the scope of the present invention.

Figure 4:
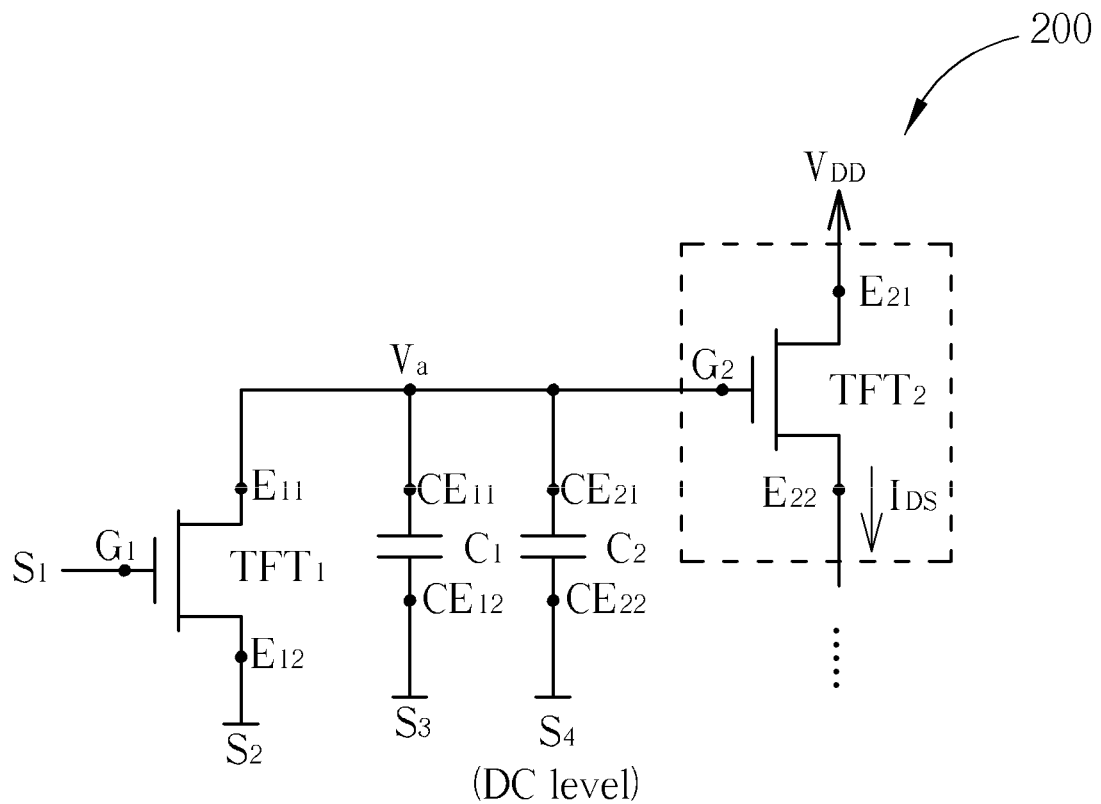
FIG. 4 is a diagram illustrating a circuit structure of a second exemplary embodiment of the sensing device according to the present invention and transition timing of control signals of the sensing device.
Figure 4:
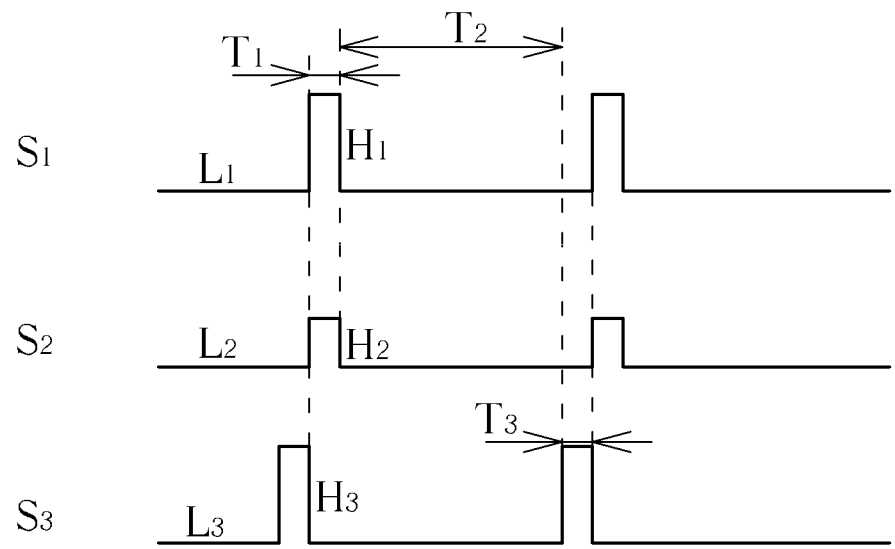

The second exemplary embodiment of the present invention provides a sensing device as shown in FIG. 4. In this exemplary embodiment, an extra element is added to the circuit structure of the sensing device 100 in the first exemplary embodiment, and the third signals $S_3$ is realized by using the driving signals on the scan lines $GL_1$-$GL_N$ and thereby save the signal generating circuit or driving circuit required for generating the third signals $S_3$. The possible exemplary implementation is detailed below. The sensing device 200 includes a first transistor $TFT_1$, a second transistor $TFT_2$, a first capacitor $C_1$ and a second capacitor $C_2$. The first transistor $TFT_1$ has a first terminal $E_{11}$, a control terminal $G_1$ and a second terminal $E_{12}$. The second transistor $TFT_2$ has a first terminal $E_{21}$, a control terminal $G_2$ and a second terminal $E_{22}$. The first capacitor $C_1$ has a first electrode $CE_{11}$ and a second electrode $CE_{12}$, and the second capacitor $C_2$ has a first electrode $CE_{21}$ and a second electrode $CE_{22}$. The first transistor $TFT_1$ is a photo-transistor. The control terminal $G_1$ of the first transistor $TFT_1$ is utilized for receiving a first signal $S_1$, and the second terminal $E_{12}$ of the first transistor $TFT_1$ is utilized for receiving a second signal $S_2$. The control terminal $G_2$ of the second transistor $TFT_2$ is electrically connected to the first terminal $E_{11}$ of the first transistor $TFT_1$. The second transistor $TFT_2$ is electrically connected to a read circuit (not shown in the figure), and the read circuit judges whether a touch event happens on the sensing device 200 according to the output current $I_{DS}$ that is generated when the second transistor $TFT_2$ is conductive. The first electrode $CE_{11}$ of the first capacitor $C_1$ and the first electrode $CE_{21}$ of the second capacitor $C_2$ are electrically connected to the first terminal $E_{11}$ of the first transistor $TFT_1$ and the control terminal $G_2$ of the second transistor $TFT_2$. The second electrode $CE_{12}$ of the first capacitor $C_1$ is electrically connected to the third signal $S_3$, and the second electrode $CE_{22}$ of the second capacitor $C_2$ is electrically connected to the fourth signal $S_4$. The first signal $S_1$ and the second signal $S_2$ are driving signals each supporting two logic levels, and are used to change the biased state of the first transistor $TFT_1$, alternately. The logic level transition timing of the third signal $S_3$ is different from the logic level transition timing of the first signal $S_1$ and second signal $S_2$, and the fourth signal $S_4$ is a direct current (DC) level signal.

Please refer to the lower part of FIG. 4 for illustration of the logic level transition timing of signals $S_1$-$S_3$. As can be known from the figure, when the sensing device 200 is operated at the resetting phase ($T_1$), the first signal $S_1$ is raised to a high logic level $H_1$, and the second signal $S_2$ is also raised to a high logic level $H_2$, which makes the first transistor $TFT_1$ stay in a forward-biased state. Meanwhile, the first capacitor $C_1$ and the second capacitor $C_2$ are both charged through the first transistor $TFT_1$, and the terminal voltage $V_a$ is raised accordingly. When the charging of the first capacitor $C_1$ and the second capacitor $C_2$ is finished, the sensing device 200 is operated at the sensing phase ($T_2$); meanwhile, the first signal $S_1$ is lowered to a low logic level $L_1$, and the second signal $S_2$ is also lowered to a low logic level $L_2$, which makes the first transistor $TFT_1$ stay in a reverse-biased state. Thus, the first transistor $TFT_1$ generates a leakage current to discharge the first capacitor $C_1$ and the second capacitor $C_2$, thereby reducing the terminal voltage $V_a$. Since the first transistor $TFT_1$ is a photo-transistor, the intensity of the leakage current changes with the ambient light source. When a touch event happens on the sensing device 200, the ambient light source is shaded, and the leakage current of the first transistor $TFT_1$ is reduced; otherwise, the leakage current of the first transistor $TFT_1$ is increased. After a period of time, the sensing device 200 enters a read phase ($T_3$). In this operational phase, the first signal $S_1$ and the second signal $S_2$ still maintain at the low logic levels $L_1$ and $L_2$, respectively, and the third signal $S_3$ is raised to a high logic level $H_3$. This voltage is coupled to the first capacitor $C_1$ and the second capacitor $C_2$, and therefore raises the terminal voltage $V_a$ to make the second transistor $TFT_2$ conductive. Consequently, an output current $I_{DS}$ is generated, where the intensity of the output current $I_{DS}$ is relevant to the terminal voltage $V_a$, which is charged to the highest level at the resetting phase and then reduced due to discharging at the following sensing phase and read phase, and a voltage value corresponding to the high logic level $H_3$ of the third signal $S_3$. Finally, the read circuit judges whether a touch event happens on the sensing device 200 according to the intensity of the output current $I_{DS}$.

In this exemplary embodiment, the first signal $S_1$ is synchronized with the second signal $S_2$; however, in other exemplary embodiments of the present invention, the first signal $S_1$ may not be synchronized with the second signal $S_2$. When the first signal $S_1$ is not synchronized with the second signal $S_2$, the pulse falling edge timing corresponding to the second signal $S_2$ may be equal to the pulse falling edge timing corresponding to the first signal $S_1$ as shown in FIG. 10, but the pulse falling edge timing corresponding to the second signal $S_2$ is required to be maintained above a certain level, in order to ensure that the voltage level of the second signal $S_2$ is fully charged while the first signal $S_1$ has the high logic level $H_1$.

In the second exemplary embodiment of the present invention, the operation thereof is almost similar to that of the first exemplary embodiment. Since the second capacitor $C_2$ and the fourth signal $S_4$ are specially added in the second exemplary embodiment, the third signals $S_3$ may be realized by the driving signals on the scan lines $GL_1$-$GL_N$ in order to save the signal generating circuit or driving circuit required for generating the third signals $S_3$.

Of course, the logic level transition timing of signals in the second exemplary embodiment of the present invention may also be similar to that shown in FIG. 10 or FIG. 11. The relationship of voltage values corresponding to logic levels of the signals is detailed as follows. In order to alternately change the biased state of the first transistor $TFT_1$ (e.g., to make the first transistor $TFT_1$ alternately operated at the forward-biased state and the reverse-biased state), the voltage value corresponding to the high logic level $H_1$ of the first signal $S_1$ must be higher than the voltage value corresponding to the high logic level $H_2$ of the first signal $S_2$ (to make the first transistor $TFT_1$ operated at the forward-biased state), and the voltage value corresponding to the low logic level $L_1$ of the first signal $S_1$ must not be higher than the voltage value corresponding to the low logic level $L_2$ of the first signal $S_2$ (to make the first transistor $TFT_1$ operated at the reverse-biased state). Besides, when the second signal $S_2$ has the high logic level $H_2$, the sensing device 200 is still operated at the resetting phase. Therefore, the second transistor $TFT_2$ is not allowed to be conductive, in order to prevent a false judgment of the touch event. However, when the second signal $S_2$ has the high logic level $H_2$, the terminal voltage $V_a$ is inevitably raised. Thus, the selection of the voltage value corresponding to the high logic level $H_2$ of the second signal $S_2$ should ensure that the second transistor $TFT_2$ would not be conductive. Moreover, the selection of the voltage value of the fourth signal $S_4$ is not limited in the present exemplary embodiment as long as the voltage value is a DC level.

Similarly, in the second exemplary embodiment of the present invention, the terminal voltage $V_a$ is electrically connected to the control terminal of the second transistor $TFT_2$; however, this is not meant to be a limitation of the present invention. In another exemplary embodiment, the terminal voltage $V_a$ may be electrically connected to the first terminal $E_{21}$ or the second terminal $E_{22}$ of the second transistor $TFT_2$. Both alternative designs fall within the scope of the present invention.

More specifically, the difference between the first exemplary embodiment and the second exemplary embodiment of the present invention is that the first signal $S_1$ and the third signal $S_3$ in the second exemplary embodiment both may be replaced by driving signals on the scan lines. The first capacitor $C_1$ and the second capacitor $C_2$ form a voltage divider. Therefore, when the high logic level $H_3$ of the third signal $S_3$ is coupled to the first capacitor $C_1$ and the second capacitor $C_2$, the terminal voltage $V_a$ generated at the sensing phase will not be over raised, and the intensity of the output current $I_{DS}$ corresponding to the present ambient light source and passing through the second transistor $TFT_2$ in the read phase. Moreover, if the first signal $S_1$ and the third signal $S_3$ are both replaced by the scan line driving signals, the relation between the voltage levels of the signals $S_1$-$S_3$ is detailed as below. As the first signal $S_1$ and the third signal $S_3$ are driving signals having the same voltage level, the voltage value corresponding to the high logic level $H_1$ of the first signal $S_1$ is equal to the voltage value corresponding to the high logic level $H_3$ of the third signal $S_3$, and the voltage value corresponding to the low logic level $L_1$ of the first signal $S_1$ is equal to the voltage value corresponding to the low logic level $L_3$ of the third signal $S_3$. Moreover, the voltage values corresponding to the low logic level $L_1$ of the first signal $S_1$ and the low logic level $L_3$ of the third signal $S_3$ are not higher than the voltage value corresponding to the low logic level $L_2$ of the second signal $S_2$, and the voltage values corresponding to the high logic level $H_1$ of the first signal $S_1$ and the high logic level $H_3$ of the third signal $S_3$ are higher than the voltage value corresponding to the high logic level $H_2$ of the second signal $S_2$.

The exemplary implementation of disposing the sensing device of the present invention in a touch-controlled display device is illustrated below. Please refer to FIG. 9. The touch-controlled display device 900 includes a plurality of pixel elements 915 arranged in a matrix, a read circuit 930 and a plurality of sensing devices 200 arranged in a matrix. Besides, the touch-controlled display device 900 further includes a plurality of scan lines $GL_1$-$GL_N$, a plurality of data lines $DL_1$-$DL_N$, and a plurality of read lines $RL_1$-$RL_N$ coupled to the read circuit 930. The pixel elements 915 are mainly utilized for displaying images to be displayed. The driving signals of the scan lines $GL_1$-$GL_N$ and the data lines $DL_1$-$DL_N$ are respectively generated by gate drivers and source drivers, and are utilized for controlling the pixel elements 915 to perform image display operation. Since those skilled in the art should readily understand the operations and principals of these circuit elements, further description is omitted here for brevity.

Figure 9:
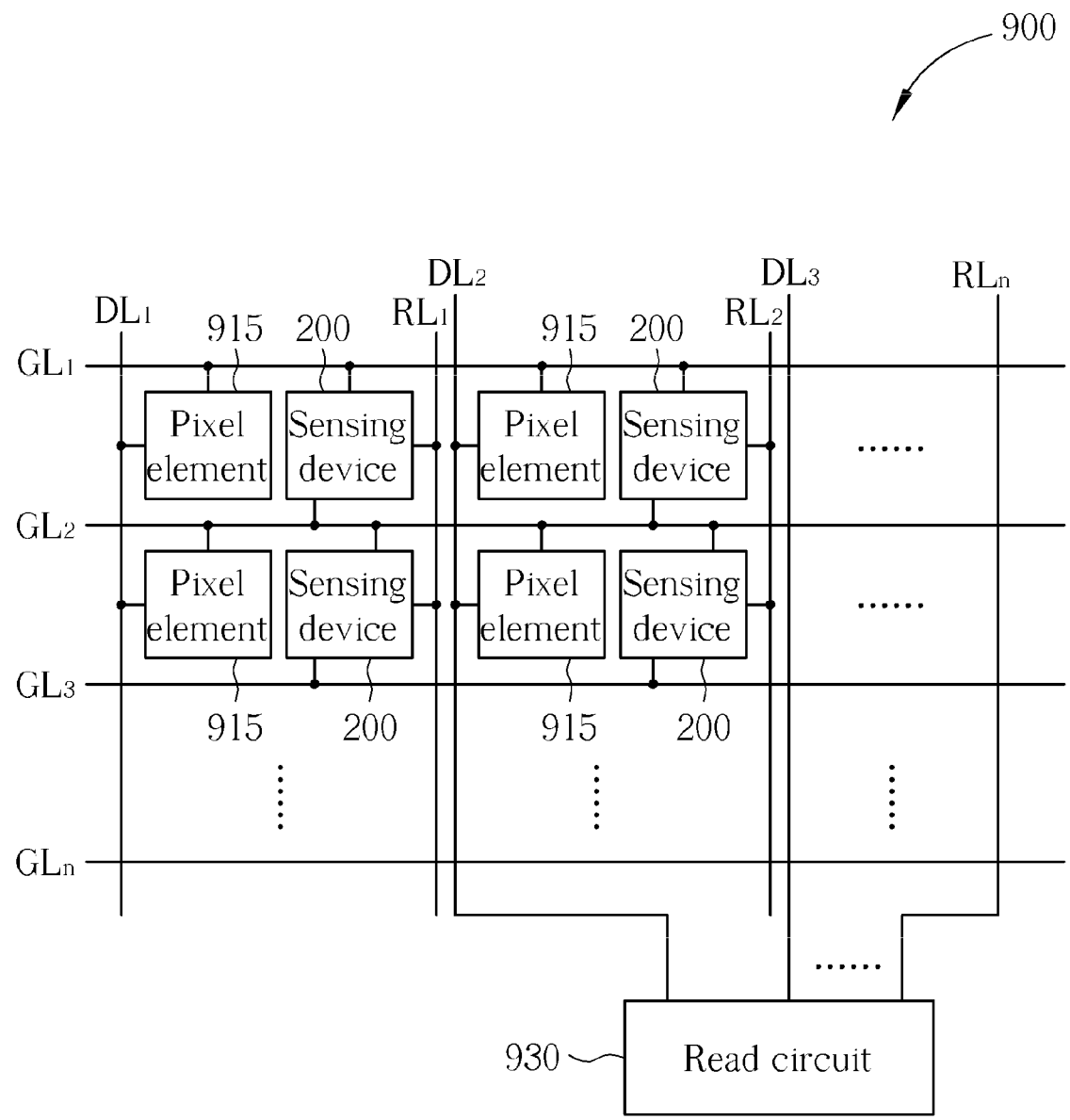
FIG. 9 is a diagram illustrating another exemplary embodiment of the display device according to the present invention.

The arrangement of sensing devices 200 is similar to that of pixel elements 915. In present invention, driving signals on the scan lines $GL_1$-$GL_N$ are utilized for acting as the first signal $S_1$ and the third signal $S_3$ to bias the sensing devices 200. Thus, sensing devices 200 are respectively connected to the scan lines $GL_1$-$GL_N$, as shown in FIG. 9. The control terminals $G_1$ of the first transistors $TFT_1$ in the sensing devices 200 and the second electrodes $CE_{12}$ of the first capacitors $C_1$ in the sensing devices 200 receive driving signals on scan lines $GL_1$-$GL_N$. Moreover, the first transistor $TFT_1$ in each of the sensing devices 200 is forward-biased and reverse-biased alternately according to the driving signals on the scan lines $GL_1$-$GL_N$, while the read circuit 930 reads sensing results (e.g., the output current $I_{DS}$) generated by the sensing devices 200 through the read lines $RL_1$-$RL_N$. Therefore, in this exemplary embodiment, the signal generating circuit or driving circuit required for generating the first signals $S_1$ and the third signals $S_3$ may be omitted. Besides, as can be known from the transition timing shown in FIG. 4, the first signal $S_1$ lags behind the third signal $S_3$. Therefore, the third signal $S_3$ is a driving signal on a scan line that has a higher priority among the scan lines (In other words, the first signal $S_1$ and the third signal $S_3$ are different scan line driving signals). For example, if the third signal $S_3$ is replaced with a driving signal of the scan line $GL_i$, the first signal $S_1$ is replaced with a driving signal of the scan line $G_{i+1}$.

Figure 5:
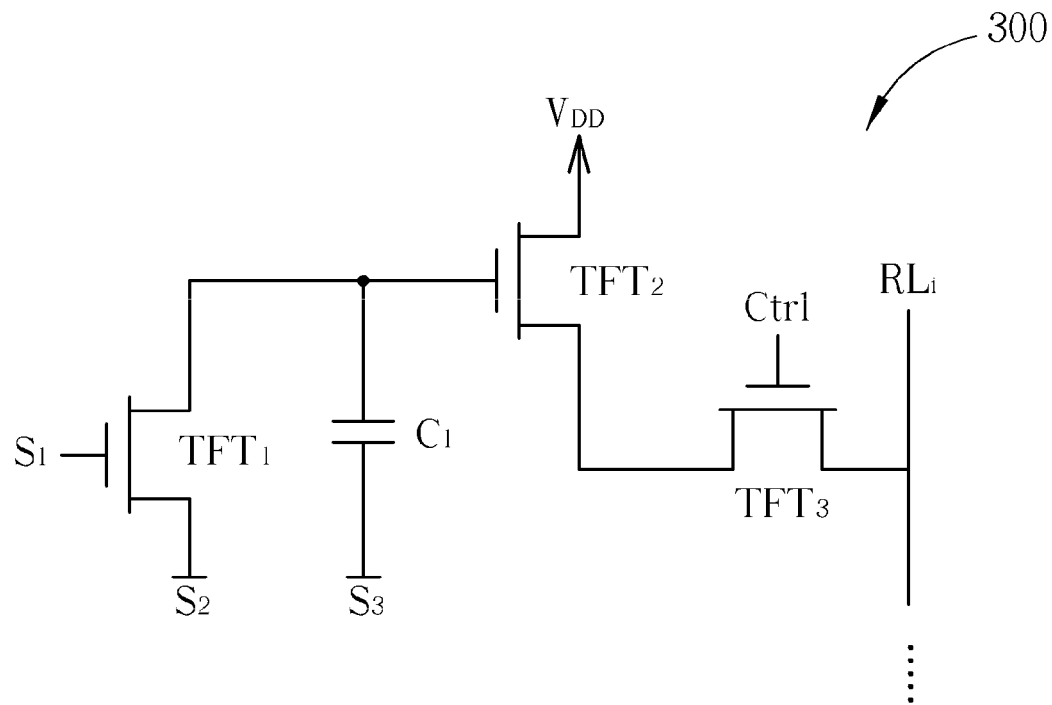
FIG. 5 is a circuit diagram of a third exemplary embodiment of the sensing device according to the present invention.
Figure 6:
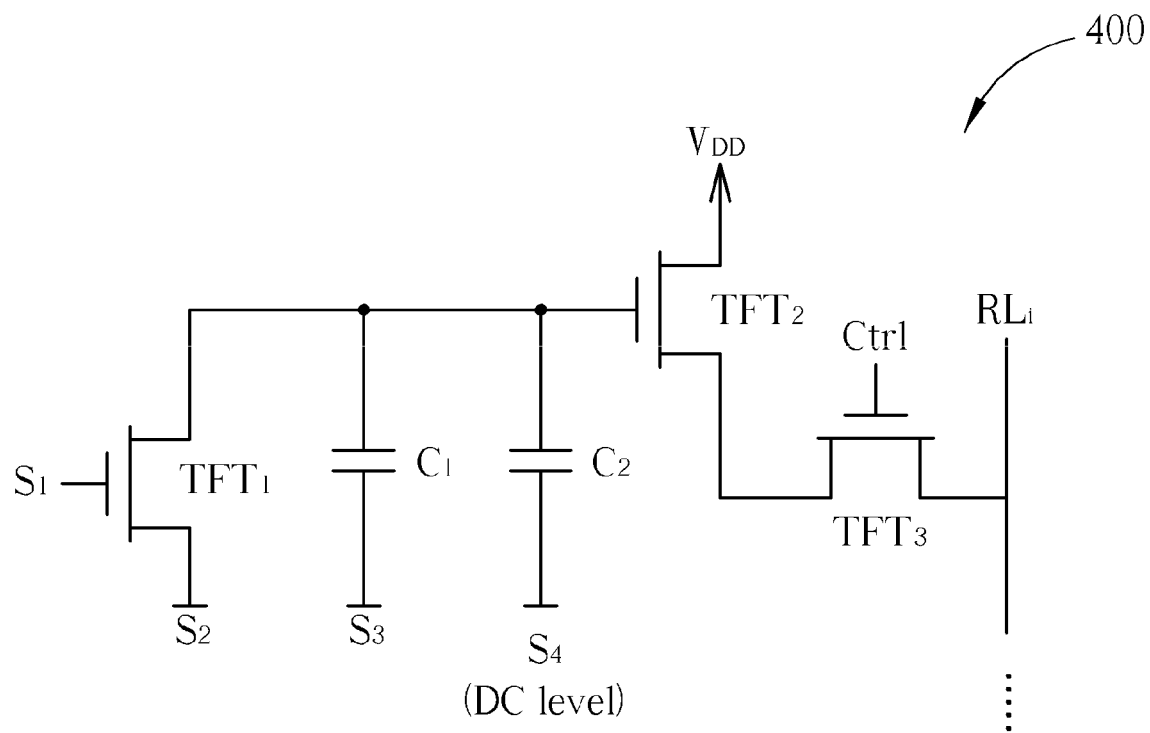
FIG. 6 is a circuit diagram of a fourth exemplary embodiment of the sensing device according to the present invention.

Besides, in order to increase the S/N ratio of the sensing device, the third exemplary embodiment and the fourth exemplary embodiment, respectively shown in FIG. 5 and FIG. 6, are provided in the present invention according to the first exemplary embodiment and the second exemplary embodiment. Compared with the first exemplary embodiment and the second exemplary embodiment, the sensing devices 300 and 400 in the third exemplary embodiment and the fourth exemplary embodiment of the present invention have the third transistors TFT3 disposed at the output terminals of the second transistors $TFT_2$ (e.g., the second terminals $E_{22}$), which may prevent interference situations as below. Please refer to FIG. 8 or FIG. 9. When the read circuit 830 or 930 reads the output current $I_{DS}$ from the sensing device 100 or 200 in the matrix of sensing devices through the read line $RL_i$, the original read operation will be disturbed if other sensing device 100 or 200 also outputs a current to the same read line $RL_i$. Therefore, the third transistor $TFT_3$ is capable of isolating an output of the second transistor $TFT_2$ in each sensing device 300 or 400. Only when the sensing device 300 or 400 is operated at the read phase, the third transistor $TFT_3$ is turned on by the control signal Ctrl, thereby allowing the output current $I_{DS}$ to be output to the read line $RL_i$. In this way, the cross-interference is avoided, and the S/N ratio is improved. Besides, since the third exemplary embodiment and the fourth exemplary embodiment of the present invention may also be controlled by the scan lines of pixels that are employed in the first exemplary embodiment and the second exemplary embodiment, further description is omitted here for brevity.

Figure 7:
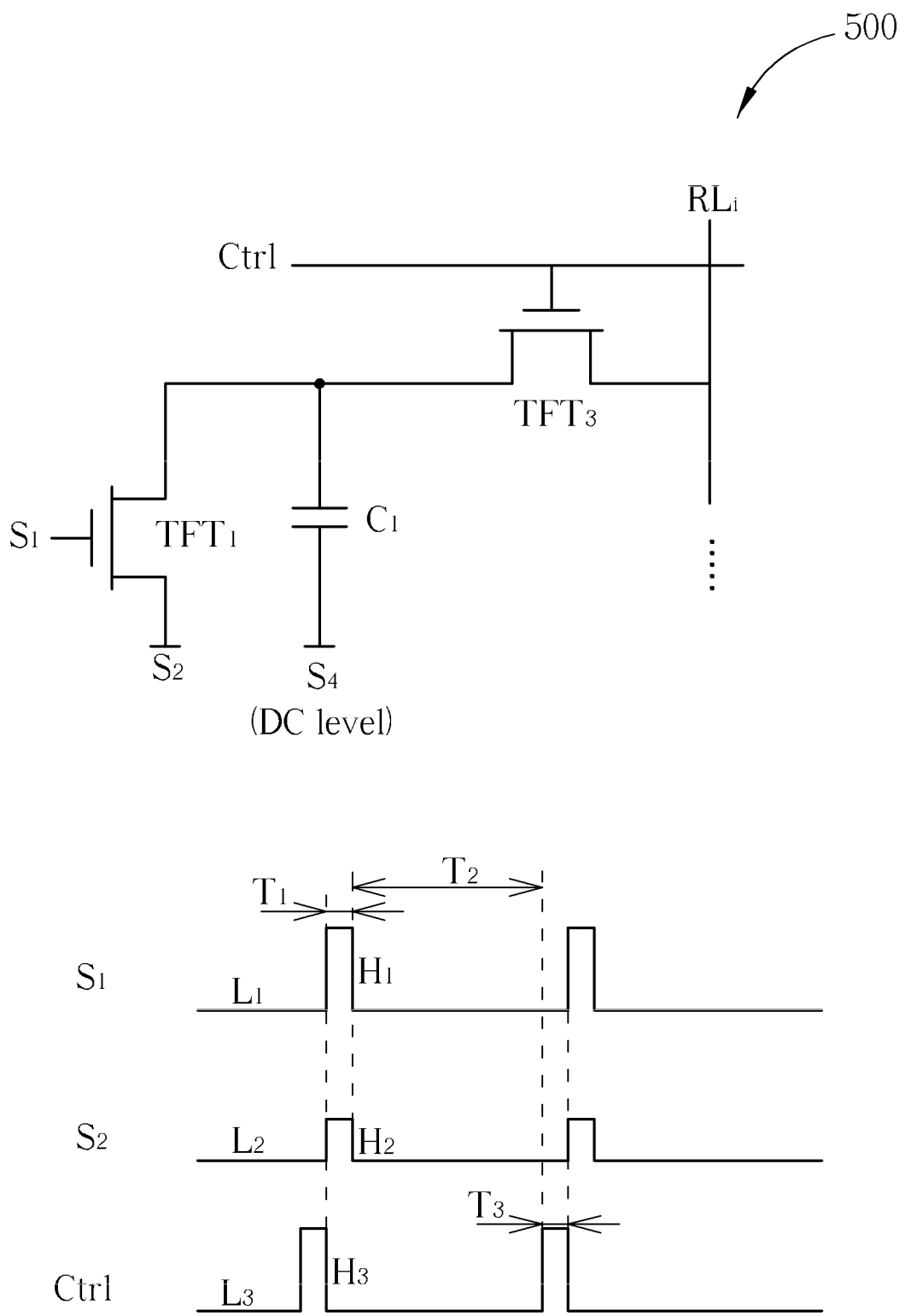
FIG. 7 is a diagram illustrating a circuit structure of a fifth exemplary embodiment of the sensing device according to the present invention and transition timing of control signals of the sensing device.

The fifth exemplary embodiment of the present invention provides a sensing device that does not use any active component to generate the output signal, such as the sensing device 500 shown in FIG. 7. The sensing device 500 does not include the second transistor $TFT_2$ in the aforementioned exemplary embodiments. In this exemplary embodiment, the terminal voltage $V_a$ corresponding to the first capacitor $C_1$ is directly utilized as the output signal, the output signal is coupled to the read line $RL_i$ through the third transistor $TFT_3$, and the coupling timing of the terminal voltage (i.e., the conductive state of the third transistor $TFT_3$) is controlled through the signal Ctrl to maintain a certain S/N ratio. The first transistor $TFT_1$ may be biased by the first signal $S_1$ and the second signal $S_2$ to stay in the forward-biased state and the reverse-biased state alternately. Moreover, the sensing device 500 may also be disposed in the touch-controlled display device as mentioned above.

Figure 12:
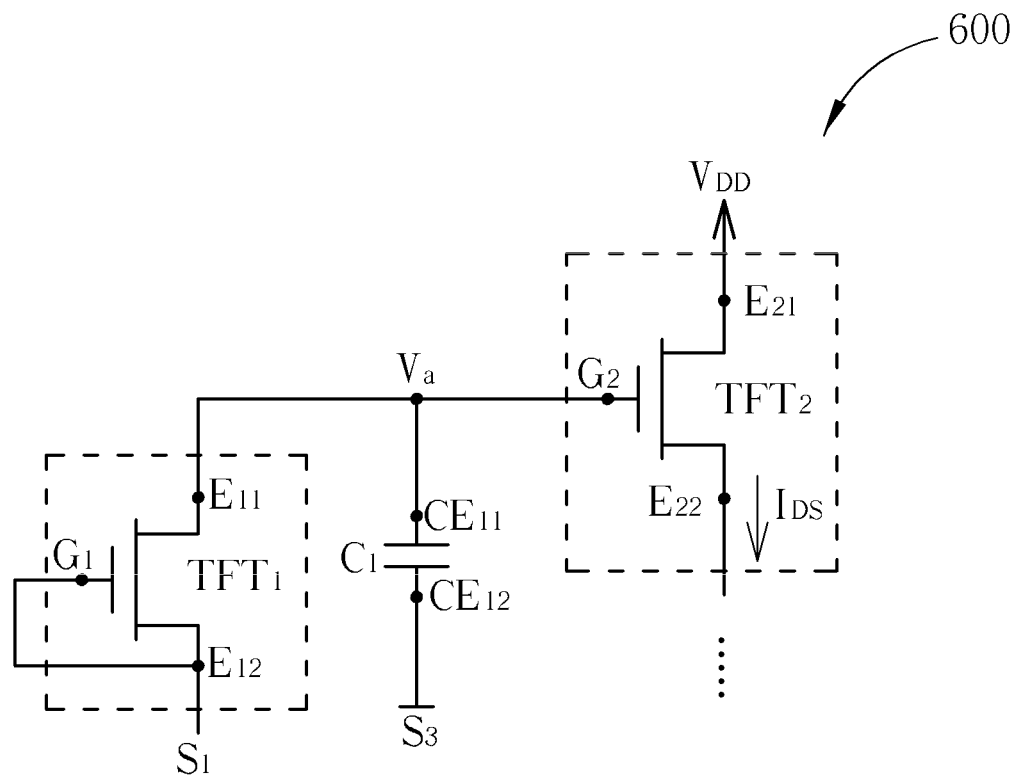
FIG. 12 is a circuit diagram of a sixth exemplary embodiment of the sensing device according to the present invention.
Figure 12:
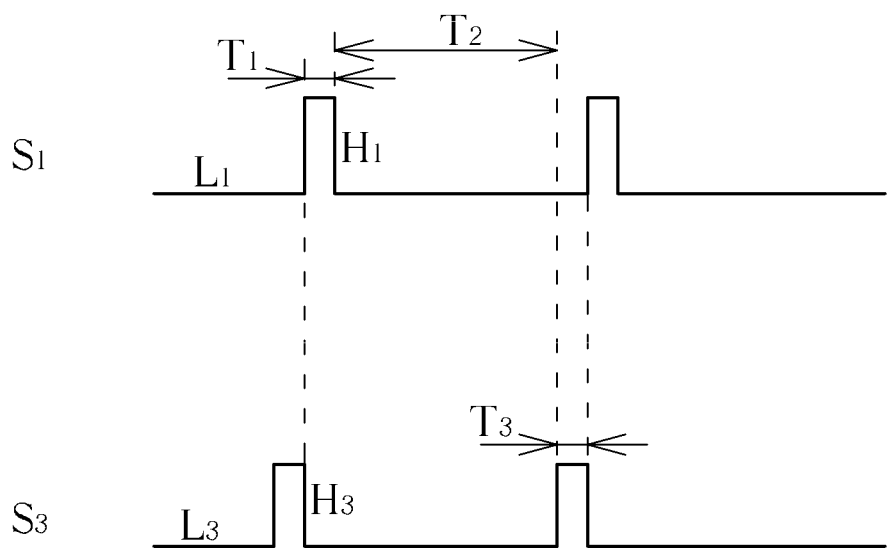
Figure 13:
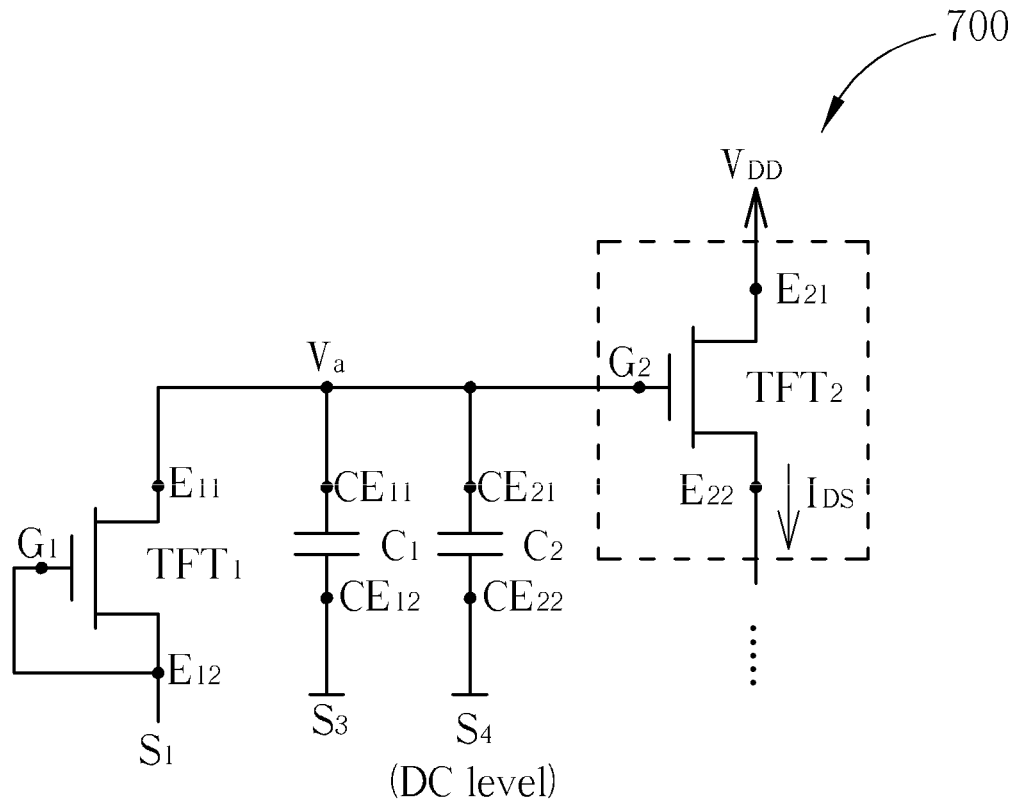
FIG. 13 is a circuit diagram of a seventh exemplary embodiment of the sensing device according to the present invention.

In the exemplary embodiments mentioned above, the sensing devices of the present invention are all implemented by photo sensing elements each having a three-terminal structure. However, by using different configuration of the control signal, a photo sensing element having a two-terminal structure may be utilized, and the biased state of the photo sensing element having a two-terminal structure may be changed alternately, wherein the photo sensing element having a two-terminal structure may be a photo-diode or a silicon rich oxide (SRO) element. Please refer to the illustration as follows. As the photo sensing element that has a two-terminal structure includes only two terminals to control its biased state, the sixth exemplary embodiment and the seventh exemplary embodiment of the present invention therefore provide a technical means which allows the two-terminal photo sensing element in the sensing device to stay in the forward-biased state and reverse-biased state alternately by using the first signal S1 only. Please refer to the sensing devices 600 and 700 shown in FIG. 12 and FIG. 13. FIG. 12 shows the sixth exemplary embodiment of the present invention. In this exemplary embodiment, the sensing device 600 includes a first transistor $TFT_1$, a first capacitor $C_1$ and a second transistor $TFT_2$. The control terminal $G_1$ of the first transistor $TFT_1$ is coupled to the second terminal $E_{12}$ of the first transistor $TFT_1$ to form a two-terminal photo sensing element. Meanwhile, the control terminal $G_1$ and the second terminal $E_{12}$ of the first transistor $TFT_1$ both receive the first signal $S_1$. Hence, when the first signal $S_1$ has a high logic level $H_1$, the first transistor $TFT_1$ stays in the forward-biased state, and when the first signal $S_1$ has a low logic level $L_1$, the first transistor $TFT_1$ stays in the reverse-biased state. FIG. 13 shows the seventh exemplary embodiment of the present invention. In this exemplary embodiment, the sensing device further includes a second capacitor $C_2$ electrically connected to the first terminal $E_{11}$ of the first transistor $TFT_1$. The sixth exemplary embodiment and the seventh exemplary embodiment of the present invention may reach the same technical effect of the aforementioned exemplary embodiments by changing the terminal signal of the transistor $TFT_1$. As the voltage level of the third signal $S_3$ in the sixth exemplary embodiment and the seventh exemplary embodiment is similar to that of the aforementioned exemplary embodiments, further description is omitted here for brevity.

Similarly, in the sixth exemplary embodiment and the seventh exemplary embodiment of the present invention, the terminal voltage $V_a$ is electrically connected to the control terminal $G_2$ of the second transistor $TFT_2$. However, in other exemplary embodiments of the present invention, the terminal voltage $V_a$ may be electrically connected to the first terminal $E_{21}$ or the second terminal $E_{22}$ of the second transistor $TFT_2$.

Figure 14:
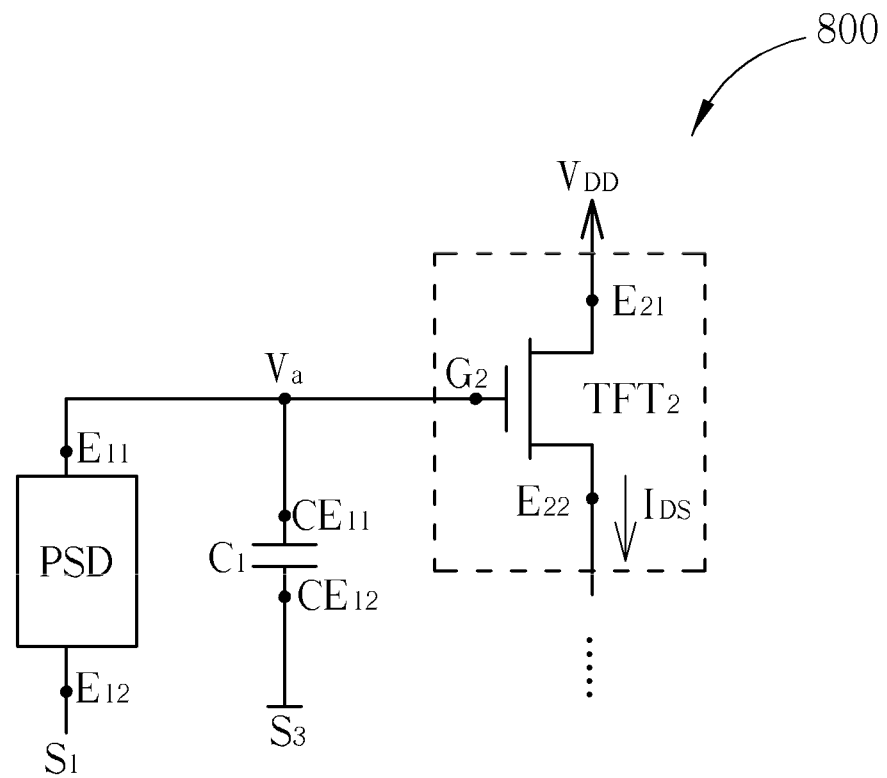
FIG. 14 is a circuit diagram of an eighth exemplary embodiment of the sensing device according to the present invention.
Figure 14:
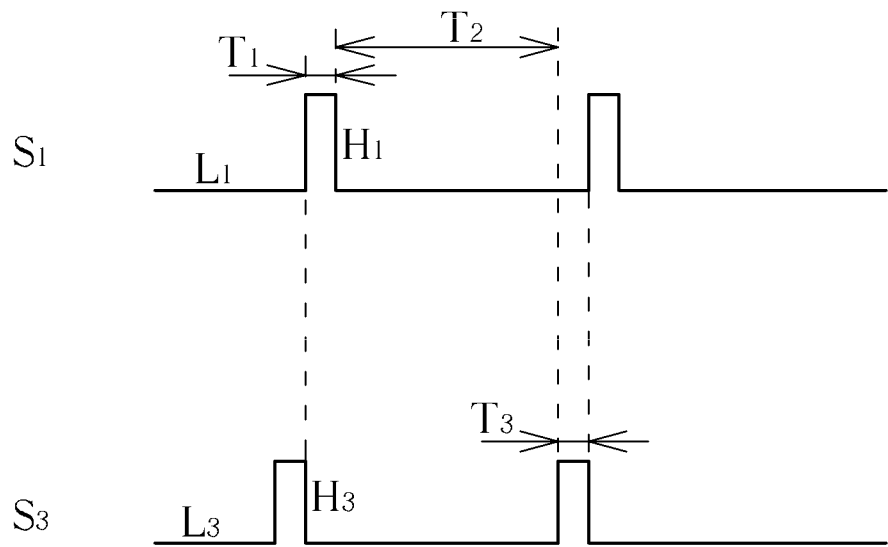
Figure 15:
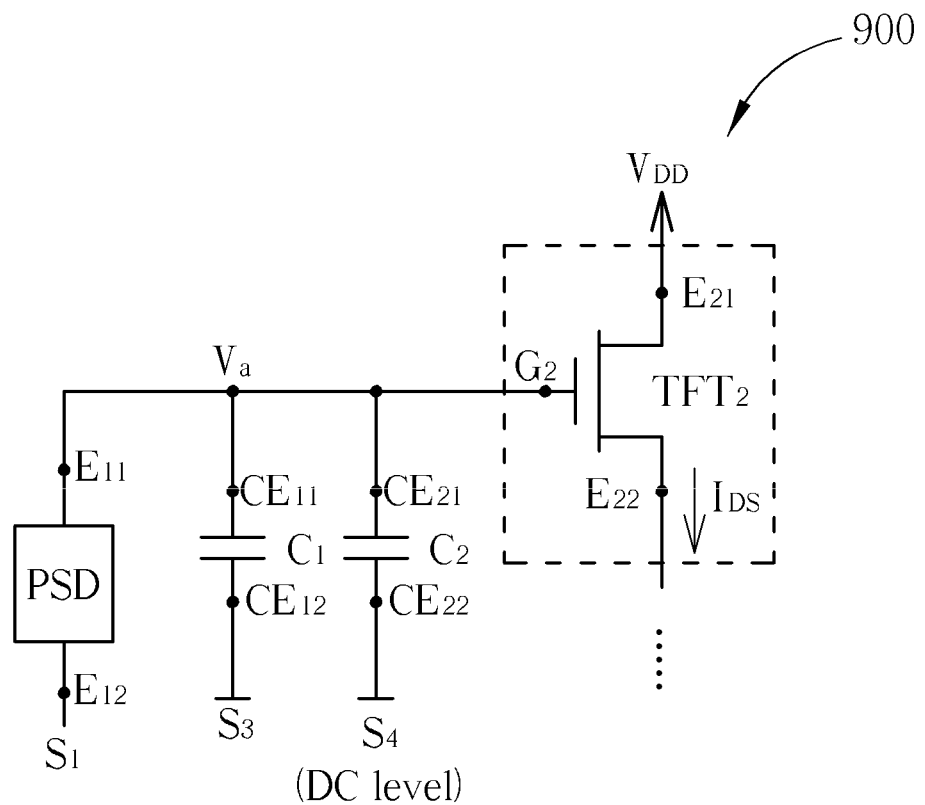
FIG. 15 is a circuit diagram of a ninth exemplary embodiment of the sensing device according to the present invention.
Figure 15:
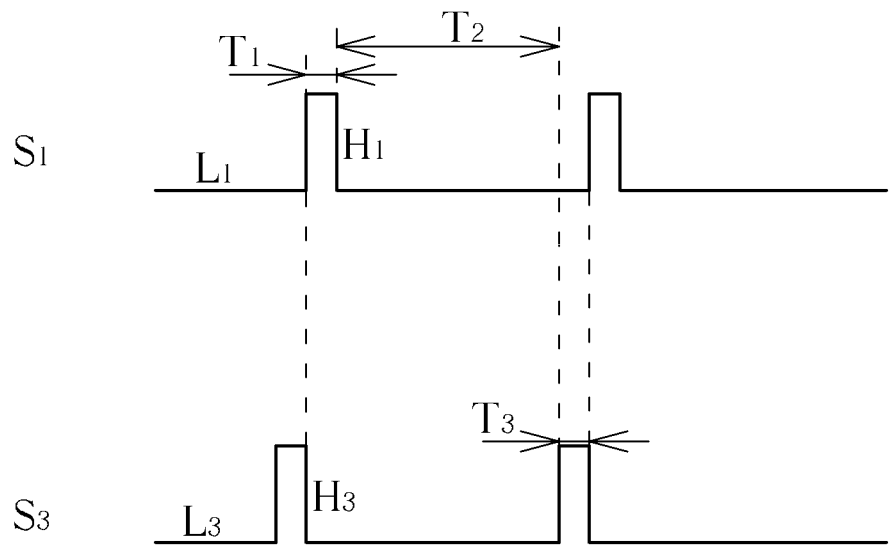

Moreover, according to the signal configuration mentioned above, the photo sensing element of the sensing device according to the present invention may be a photo diode or other photo semiconductor element. Please refer to FIG. 14 and FIG. 15. FIG. 14 shows the eighth exemplary embodiment of the present invention. In this exemplary embodiment, a first terminal $E_{11}$ of the photo semiconductor element PSD of the sensing device 800 is electrically connected to the control terminal $G_2$ of the second transistor $TFT_2$ and the first electrode $CE_{11}$ of the first capacitor $C_1$, and a second terminal $E_{12}$ of the photo semiconductor element PSD is utilized for receiving the first signal $S_1$. FIG. 15 shows the ninth exemplary embodiment of the present invention. In this exemplary embodiment, a first terminal $E_{11}$ of the photo semiconductor element PSD of the sensing device 900 is coupled to the control terminal $G_2$ of the second transistor $TFT_2$, the first electrode $CE_{11}$ of the first capacitor $C_1$ and the first electrode $CE_{21}$ of the second capacitor $C_2$, and a second terminal $E_{12}$ of the photo semiconductor element PSD is utilized for receiving the first signal $S_1$.

When the first signal $S_1$ has a high logic level $H_1$, the photo semiconductor element PSD stays in a forward-biased state, and when the first signal $S_1$ has a low logic level $L_1$, the photo semiconductor element PSD stays in a reverse-biased state. It should be noted that the implementation of the photo semiconductor element PSD is not limited in the present invention. Any semiconductor element with photo sensing effect may be utilized in the exemplary embodiment of the present invention.

Similarly, in the eighth exemplary and the ninth exemplary of the present invention, the terminal voltage $V_a$ is electrically connected to the control terminal $G_2$ of the second transistor $TFT_2$. However, in other exemplary embodiments of the present invention, the terminal voltage $V_a$ may be electrically connected to the first terminal $E_{21}$ or the second terminal $E_{22}$ of the second transistor $TFT_2$.

Please note that the different technical features mentioned in the aforementioned exemplary embodiments are not limited to these exemplary embodiments only. In fact, within the reasonable scope of the present invention, proper modification may be made to one exemplary embodiment to make the exemplary embodiment have specific technical features of other exemplary embodiments. For example, regarding the sixth exemplary embodiment to the ninth exemplary embodiment, an extra third transistor $TFT_3$ may be added at the output terminal of the second transistor $TFT_2$ (i.e., the first terminal $E_{21}$ or the second terminal $E_{22}$) to isolate the output current $I_{DS}$ of each sensing device, thereby improving the S/N ratio. Besides, similar to the first exemplary embodiment to the fifth exemplary embodiment, the sixth exemplary embodiment to the ninth exemplary embodiment of the present invention may also be disposed in a display device.

To sum up, the alternating current (AC) signal characteristic of the first signal $S_1$ or/and the second signal $S_2$ in the present invention is utilized for making the transistor in the sensing device stay in the forward-biased state and the reverse-biased state alternately, in order to prevent the stress issue. Besides, the driving signals on scan lines of the display device may be utilized for controlling transistors in the sensing devices to thereby save the cost of a signal generating circuit. Moreover, an output signal may be generated through an active component to thereby improve the S/N ratio of the sensing device.

Those skilled in the art will readily observe that numerous modifications and alterations of the device and method may be made while retaining the teachings of the invention.

What is claimed is:

1. A sensing device, comprising:
    a photo sensing element, being a photo-transistor, having a first terminal for receiving a second signal and a control terminal for receiving a first signal;
    wherein the first signal and the second signal are both driving signals each supporting two logic levels, and a voltage value corresponding to a high logic level of the first signal is higher than a voltage value corresponding to a high logic level of the second signal; and a voltage value corresponding to a low logic level of the first signal is not higher than a voltage value corresponding to a low logic level of the second signal.

2. The sensing device of claim 1, wherein a logic level transition of the first signal is synchronized with a logic level transition of the second signal.

3. The sensing device of claim 1, wherein a logic level transition of the first signal is not synchronized with a logic level transition of the second signal.

4. The sensing device of claim 3, wherein a pulse falling edge timing corresponding to the second signal is equal to a pulse falling edge timing corresponding to the first signal.

5. The sensing device of claim 3, wherein a pulse falling edge timing corresponding to the second signal lags behind a pulse falling edge timing corresponding to the first signal.

6. The sensing device of claim 1, wherein the photo sensing element further comprises a second terminal, and the sensing device further comprises:
    a first capacitor, having a first electrode electrically connected to the second terminal of the photo sensing element and a second electrode electrically connected to a third signal; and
    a first transistor, electrically connected to the second terminal of the photo sensing element and having a first terminal, a control terminal and a second terminal.

7. The sensing device of claim 6, wherein when the second signal has a high logic level, the first transistor is not conductive, and a logic level transition timing of the third signal is different from a logic level transition timing of each of the first signal and the second signal.

8. The sensing device of claim 6, further comprising:
a second capacitor, having a first electrode electrically connected to the first electrode of the first capacitor and a second electrode.

9. The sensing device of claim 8, wherein a voltage value corresponding to a high logic level of the first signal is equal to a voltage value corresponding to a high logic level of the third signal, and a voltage value corresponding to a low logic level of the first signal is equal to a voltage value corresponding to a low logic level of the third signal.

10. The sensing device of claim 7, wherein the first transistor is electrically connected to the second terminal of the photo sensing element through the first terminal of the first transistor, and the first terminal of the first transistor is electrically connected to the first electrode of the first capacitor.

11. A sensing device, comprising:
a photo sensing element, having a first terminal for receiving a second signal and a control terminal for receiving a first signal;
wherein the first signal and the second signal are both driving signals each supporting two logic levels, and a voltage value corresponding to a high logic level of the first signal is higher than a voltage value corresponding to a high logic level of the second signal; and a voltage value corresponding to a low logic level of the first signal is not higher than a voltage value corresponding to a low logic level of the second signal; a logic level transition of the first signal is not synchronized with a logic level transition of the second signal, and a pulse falling edge timing corresponding to the second signal is equal to or lags behind a pulse falling edge timing corresponding to the first signal.

12. A sensing device, comprising:
a photo sensing element, having a first terminal for receiving a second signal; a second terminal; and a control terminal for receiving a first signal;
a first capacitor, having a first electrode electrically connected to the second terminal of the photo sensing element and a second electrode electrically connected to a third signal; and
a first transistor, electrically connected to the second terminal of the photo sensing element and having a first terminal, a control terminal and a second terminal, wherein the first transistor is electrically connected to the second terminal of the photo sensing element through the control terminal of the first transistor, and the control terminal of the first transistor is electrically connected to the first electrode of the first capacitor;
wherein the first signal and the second signal are both driving signals each supporting two logic levels, and a voltage value corresponding to a high logic level of the first signal is higher than a voltage value corresponding to a high logic level of the second signal; and a voltage value corresponding to a low logic level of the first signal is not higher than a voltage value corresponding to a low logic level of the second signal.

13. The sensing device of claim 12, further comprising:
a second transistor, having a first terminal electrically connected to the second terminal of the first transistor, a control terminal for receiving a control signal and a second terminal electrically connected to a data read line, wherein the control signal is utilized for controlling a conductive state of the second transistor.

14. A touch-controlled display device, comprising:
a plurality of scan lines for receiving scan line driving signals;
a plurality of data lines;
a plurality of sensing devices arranged in a matrix, each of the plurality of sensing devices being coupled to at least one of the plurality of scan lines, wherein each of sensing devices comprises:
a photo sensing element, having a first terminal for receiving a second signal; a second terminal; and a control terminal for receiving a first signal;
a first capacitor, having a first electrode electrically connected to the second terminal of the photo sensing element and a second electrode electrically connected to a third signal; and
a first transistor, electrically connected to the second terminal of the photo sensing element and having a first terminal, a control terminal and a second terminal;
wherein the first signal and the second signal are both driving signals each supporting two logic levels, and a voltage value corresponding to a high logic level of the first signal is higher than a voltage value corresponding to a high logic level of the second signal; and a voltage value corresponding to a low logic level of the first signal is not higher than a voltage value corresponding to a low logic level of the second signal; and
a plurality of pixel elements arranged in a matrix, each of the plurality of pixel elements being coupled to one of the plurality of scan lines and to one of the plurality of data lines, respectively;
wherein the first signal is one of the scan line driving signals.

15. The touch-controlled display device of claim 14, wherein each of the sensing devices further comprises:
a second capacitor, having a first electrode electrically connected to the first electrode of the first capacitor and a second electrode;
wherein the first signal and the third signal are different scan line driving signals of the scan lines, and an activation timing of the third signal is prior to an activation timing of the first signal.

* * * * *